United States Patent [19]
Monty et al.

[11] Patent Number: 5,815,285
[45] Date of Patent: Sep. 29, 1998

[54] FACSIMILE DEVICE WITH USER-FRIENDLY AUTOMATIC RECEIVE MODE

[75] Inventors: Melissa L. Monty, Poway; Paul Albitz, San Diego, both of Calif.

[73] Assignee: Hewlett-Packard Company, Palo Alto, Calif.

[21] Appl. No.: 701,413

[22] Filed: Aug. 22, 1996

[51] Int. Cl.$^6$ ........................................................ H04N 1/32
[52] U.S. Cl. ........................ 358/442; 358/439; 379/93.09; 379/100.16
[58] Field of Search ..................................... 358/434–436, 358/438–439, 442, 468; 379/93.09, 93.11, 93.18, 93.26, 100.05, 100.16; H04N 1/32

[56] References Cited

U.S. PATENT DOCUMENTS

| | | |
|---|---|---|
| 5,151,972 | 9/1992 | Lorenz et al. . |
| 5,617,221 | 4/1997 | DeVries et al. ........................ 358/442 |
| 5,666,403 | 9/1997 | Telibasa .............................. 379/93.09 |

*Primary Examiner*—Kim Yen Vu

[57] ABSTRACT

A facsimile machine is provided with only two receive modes: "Auto Answer" and as "Manual". In the Auto Answer mode the device will automatically receive incoming facsimiles and in the Manual mode it will not. The Auto Answer mode allows the user to automatically receive facsimile calls on either a dedicated facsimile line or a line shared with any other receiving device such as a telephone or answering machine. Since several receive modes have been collapsed into a single mode that may be used for all configurations, the user simply controls the behavior he desires by turning Auto Answer mode ON or OFF (i.e., Auto Answer mode must be ON for the facsimile to eavesdrop, or to answer the call when nothing else answers), with Auto Answer OFF being equivalent to Manual mode ON, and vice versa. In Auto Answer mode, "eavesdropping" for a CNG sequence is enabled for all incoming calls answered by another device, and "silent detection" is enabled for at least those devices which are connected in series with ("downstream" from) the facsimile. In order to support users who are accustomed to change the receive mode setting each time they receive a facsimile, the facsimile device is preferably provided with a dedicated button on the front panel that requires only a single press to switch the device between Auto Answer mode and to Manual mode and an LED or other indicator device to alert the user when the unit is set to Auto Answer mode.

8 Claims, 4 Drawing Sheets

FACSIMILE DEVICE WITH USER-FRIENDLY AUTOMATIC RECEIVE MODE

TECHNICAL FIELD

The present invention relates generally to facsimile machines and more specifically to an improved automatic receive mode requiring a minimum of user input.

BACKGROUND ART

Early facsimile machines were easy to set up, but had few features. As more features were added, the set up process became more complex both in the number of user specified inputs and in the interrelationships between the various settings. For example, some prior art designs had three or four operational modes for receiving incoming faxes, and many users experienced difficulty in understanding the subtle differences between the various receive modes and which automatic receive mode they should use to obtain the behavior they want from their facsimile machine when it answered the telephone. Because the differences between some of the receive modes were subtle, it was difficult to explain to users how the modes differed. These problems were exacerbated when the user desired to set up the facsimile machine to work in conjunction with an answering machine.

In a typical prior art facsimile machine with three modes, there is provided a special mode for using the facsimile on the same line as a telephone answering machine ("Facsimile/TAM" mode). When the device is set to either Auto Answer mode or Facsimile/TAM mode, if another device answers the call, such as an answering machine or telephone, the facsimile will eavesdrop on the call for a period of time and if it recognizes the tones generated by a calling facsimile machine, it will respond automatically and receive the facsimile. However, when such a device is installed on a dedicated facsimile line (or any line that is not always answered by another device), the user must specify the Auto Answer mode in which the facsimile device automatically answers the incoming call after a set number of rings. If the user has a telephone answering machine, they are instructed to set their facsimile machine to Facsimile/TAM receive mode to force the answering machine to answer the call (which is then eavesdropped by the facsimile machine). In Facsimile/TAM mode, in order to assure that a call is not missed by the answering machine, either the call is never answered or it is answered only after a long timeout, but this has the disadvantage that if the answering machine does not answer (because it is turned OFF or Is out of order) or if the facsimile call hangs up before the timeout, then the facsimile call will be missed.

The situation was even more confusing when users installed their facsimile machine on their home telephone line which was normally used to receive telephone calls manually (with the telephone answering machine and a facsimile machine connected to the same line but turned OFF), but which was occasionally answered by a telephone answering machine or was used to receive facsimile calls. In that case, it was not clear whether they should set the facsimile machine to the Auto Answer mode or the Facsimile/TAM mode, and communicating the differences to users was difficult.

A further complication is caused by a Silent Detection option which in certain prior art machines was available in the Facsimile/TAM mode but not in Auto Answer mode, especially if the user wished to receive facsimile calls from silent facsimiles (i.e., facsimiles that do not transmit a CNG tone when the receiving device went off-hook) as well as voice calls.

Telephone answering machines typically have only two modes of operation: ON and OFF. As a result, many users with telephone answering machines have adopted a simple manual protocol for receiving facsimiles on a shared line, even though their facsimile may have supported a more automated facsimile receive strategy:

1. Someone will call the user saying they are about to send the user a facsimile.
2. The user will hang up and switch their facsimile from OFF (or manual receive mode) to ON (automatic receive mode)
3. When the phone rings next, the user will not answer the telephone but instead will allow the facsimile to take the call.
4. After the facsimile is received, the user will switch the facsimile back from ON (automatic receive mode) to OFF (manual receive mode).
5. The telephone answering machine and the facsimile are not both turned ON at the same time.

DISCLOSURE OF INVENTION

In accordance with the present invention, a facsimile machine is provided with only two receive modes, one of which being referred to as "Auto Answer" and the other as "Manual". In the Auto Answer mode the device will automatically receive incoming facsimiles and in the Manual mode it will not. The Auto Answer mode allows the user to automatically receive facsimile calls on either a dedicated facsimile line or a line shared with any other receiving device such as a telephone or answering machine, with "eavesdropping" for a CNG sequence being enabled for all incoming calls answered by another device, and with "silent detection" enabled for at least those devices which are connected in series with ("downstream" from) the facsimile.

Since several receive modes have been collapsed into a single mode that may be used for all configurations, the user simply controls the behavior he desires by turning Auto Answer mode ON or OFF (i.e., Auto Answer mode must be ON for the facsimile to eavesdrop, or to answer the call when nothing else answers), with Auto Answer OFF being equivalent to Manual mode ON, and vice versa.

In a preferred embodiment, the number of rings before the facsimile goes off-hook (answers an incoming call) is set by default to 2; however, it can be changed by the user to a higher or lower value to ensure that if an active answering machine is present, the answering machine will answer the call before the facsimile, and/or that the user is given sufficient time to answer a voice call (after which the facsimile machine would immediately answer the incoming voice call with a CED sequence indicating that the call has been answered by a facsimile machine).

In order to support users who are accustomed to change the receive mode setting each time they receive a facsimile, the facsimile device is preferably provided with a dedicated button on the front panel that requires only a single press to switch the device between Auto Answer mode and to Manual mode and an LED or other indicator device to alert the user when the unit is set to Auto Answer mode.

When the Auto Answer mode is OFF and the line rings, the facsimile device will not respond, but it preferably does detect the ring and count the number of rings, so that if Auto Answer mode is subsequently turned ON after the ringing has commenced, the facsimile will answer the phone after the set number of rings to answer occur (counted from the beginning of the ring), and eavesdropping will be enabled if the call is answer by another device.

PREFERRED MODE FOR PRACTICING THE INVENTION

Figure 1:
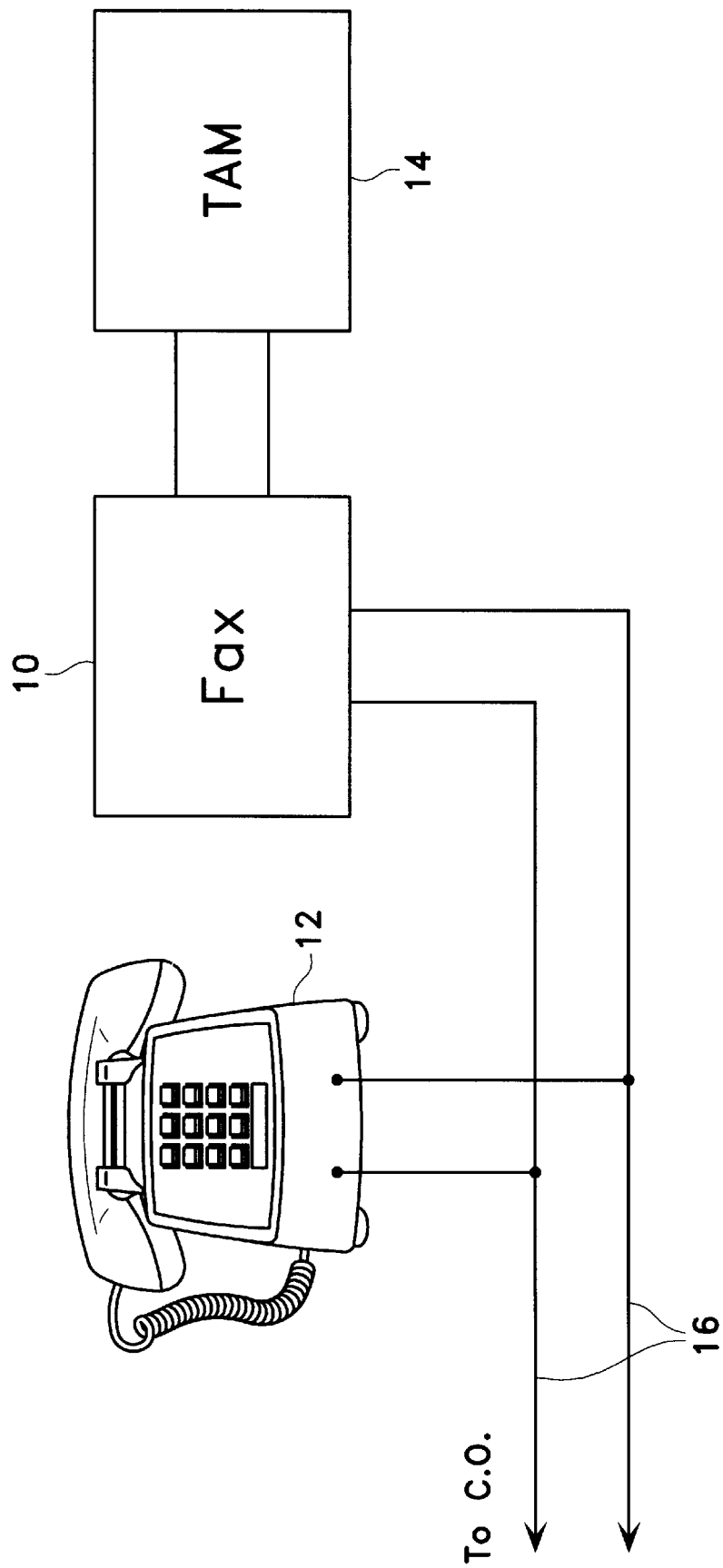
FIG. 1 is a block diagram showing how a facsimile and other devices may be connected to a communications line.

Reference should now be made to FIG. 1, which is a block diagram showing how a facsimile 10 and other receiving devices such as a telephone 12 and telephone answering machine 14 may be connected in conventional fashion to a communications line 16. In particular, note that the telephone 12 is connected in parallel with the facsimile 10, thereby permitting either device to go "off-hook" and send a signal to the telephone company's central office (not shown) that the device is ready to answer the incoming call and that the ringing should stop. Accordingly, in such a parallel arrangement, either device may answer a call whether any other device is connected and operational. In contrast, the telephone answering machine 14 is connected to the communications line 16 by means of a series connection via the facsimile 10 (that is, it is "downstream" from the facsimile 10), and accordingly, the facsimile 10 can control the functioning of the telephone answering machine 14, for example by temporarily disconnecting the telephone answering machine 14 from the line if the facsimile 10 detects a CNG tone on the communications line 16 representative of an incoming facsimile transmission.

Figure 2:
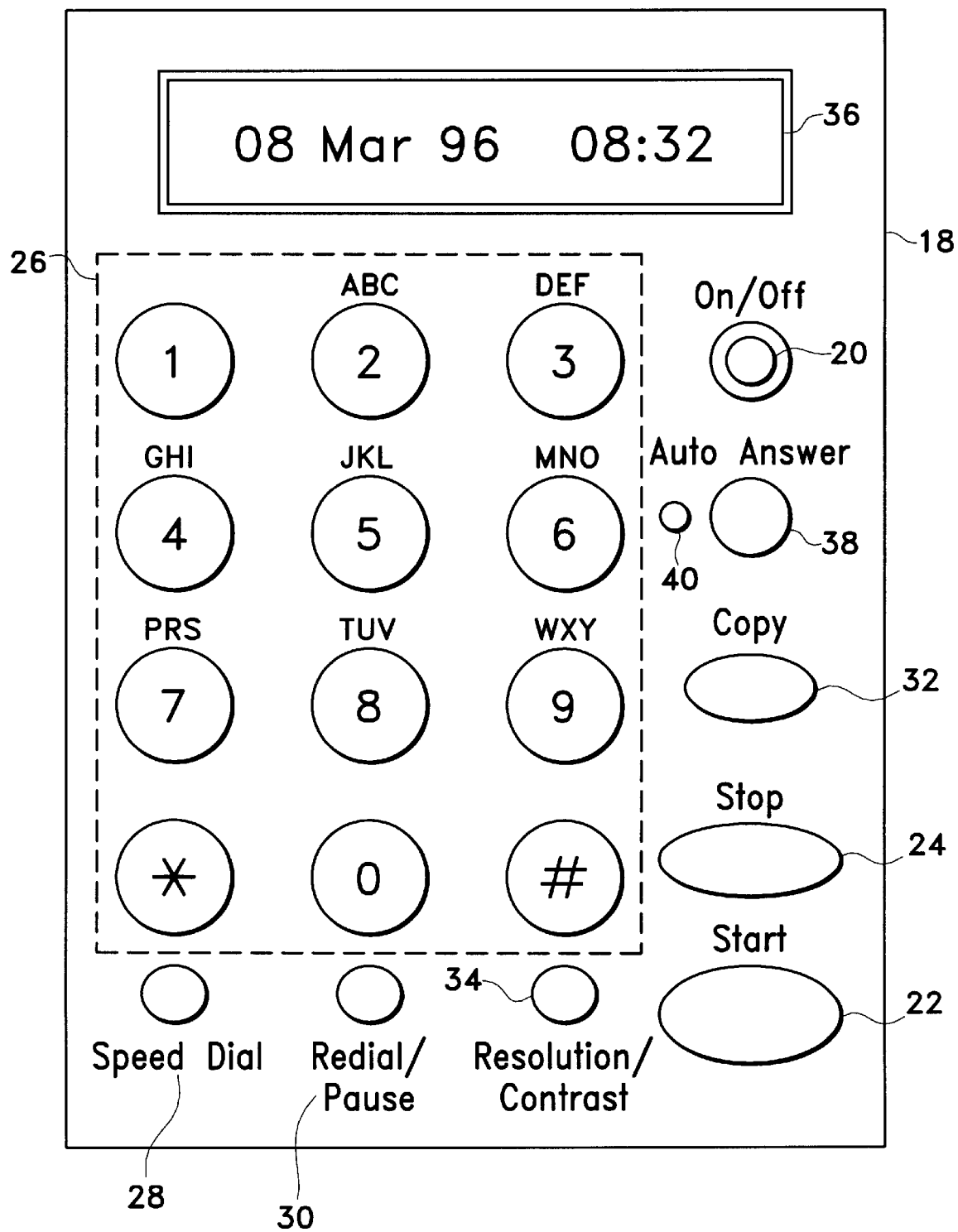
FIG. 2 shows a front panel of facsimile device in accordance with the present Invention.

Referring now to FIG. 2, which shows a front panel 18 of the facsimile device 10 it will be noted that the facsimile device 10 includes various conventional elements such as a power switch 20, manual controls for starting 22 and stopping 24 the device when operating in manual mode and a standard telephone keypad 26 with speed dialing 28 and re-dialing/pause 30 capabilities, dedicated controls for making copies 32 and for adjusting the resolution/contrast 34, as well as a conventional time/date display 36 which can also be used for other conventional display functions associated with whatever task is currently being performed, such as indicating the phone number of an outgoing call or the TSI (transmitting station identifier) associated with an incoming facsimile call, or otherwise detailing the status of the current task.

In accordance with the present invention, the front panel 18 is also provided with a unitary facsimile mode control in the form of an Auto Answer button 38 whose current status is indicated by an accompanying LED 40.

Figure 3:
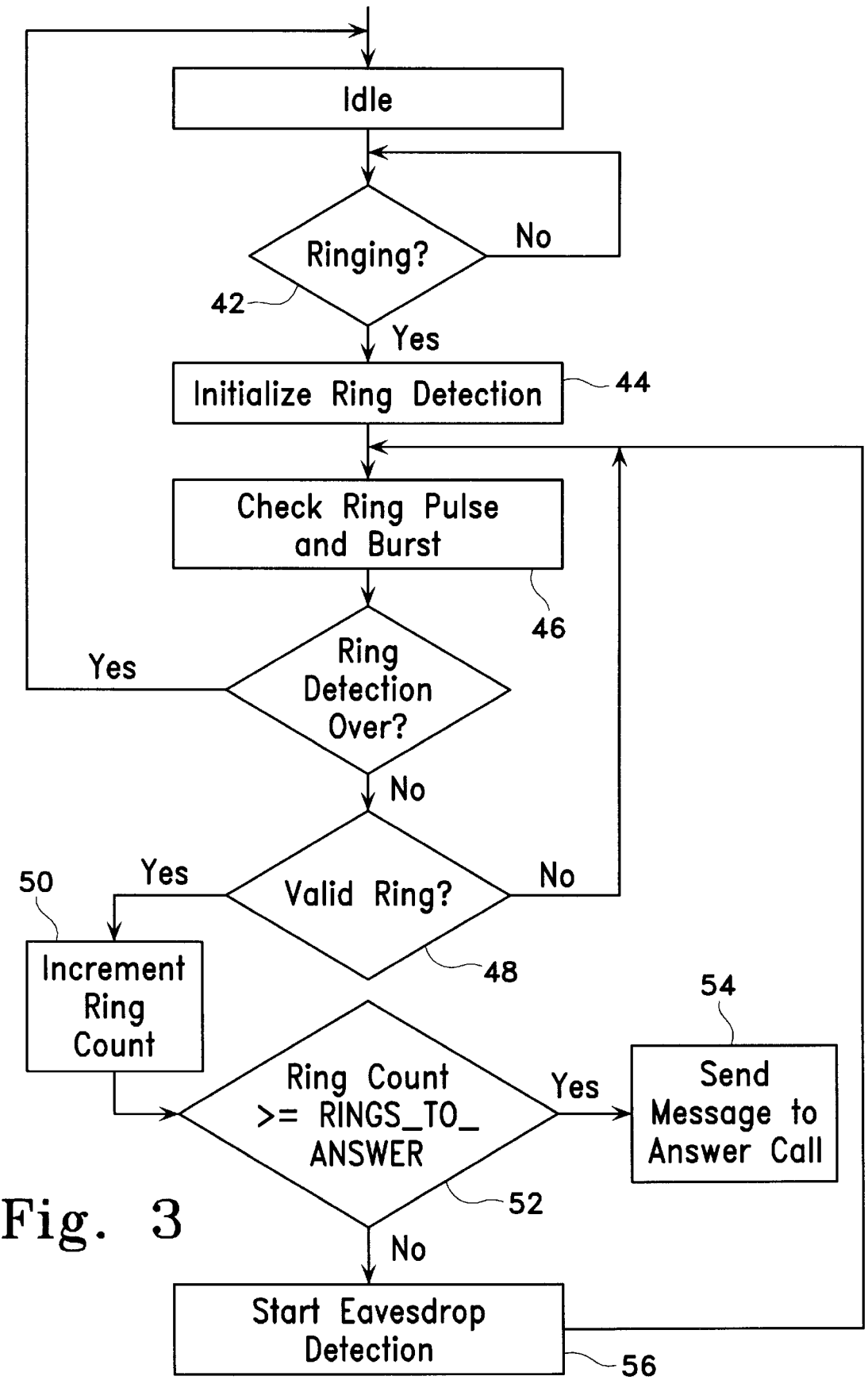
FIG. 3 is a flow diagram of a ring detection process

Referring to FIG. 3, when the Auto Answer mode button 38 is switched on, the Auto receive mode functions as follows:

When the line rings (block 42), the facsimile device 10 initializes (block 44) a ring detection process which confirms that a valid ring has been detected (blocks 46, 48) and increments the ring count (block 50). Once the number of rings reaches a predetermined value (decision block 52) the device goes off hook and answers the incoming call (block 54. "RINGS_TO_ANSWER" is a predetermined number of rings based on a programmed default from a remote personal computer (not shown). The call answer process (block 54) is conventional and answers the incoming call by causing the device to go (or remain) off-hook (thereby signaling to the central office that the call has been answered and that the ringing signals should stop) and to transmit a conventional sequence of facsimile response tones to initiate transmission of a facsimile message.

If the predetermined ring count RINGS_TO_ANSWER has not yet been met (NO branch from block 52, a call monitoring or "eavesdrop" process (block 56) is performed concurrently with the ring detection process (blocks 46–52), which determine if, in response to the incoming call being answered by another device, signal sequence representative of an incoming facsimile call has been received, in which case the facsimile device 10 goes off-hook and generates the appropriate facsimile response tones.

Figure 4:
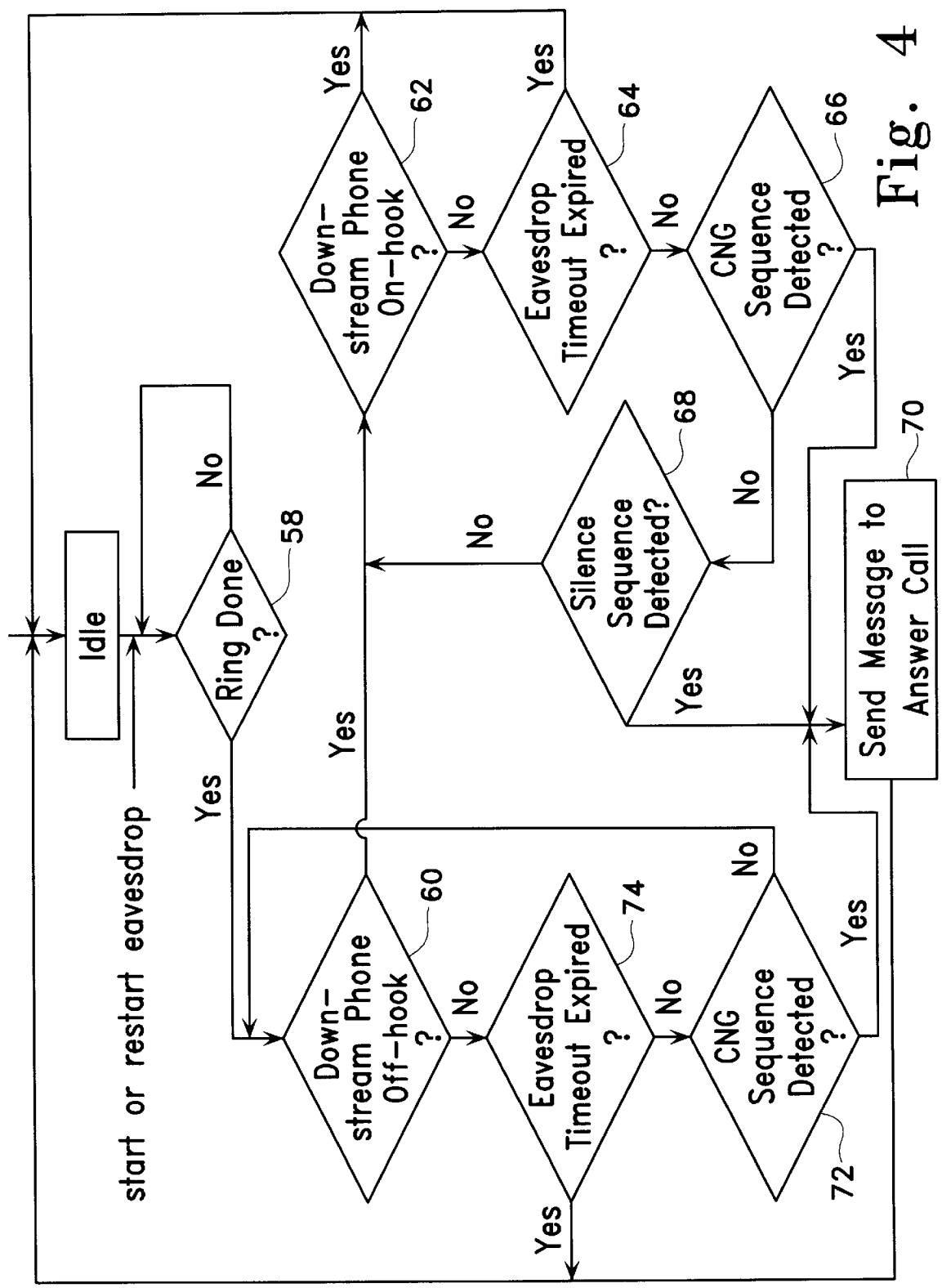
FIG. 4 is a flow diagram of a call monitoring process

The eavesdropping process is shown in more detail in FIG. 4.

Assuming that ringing signal has stopped at least momentarily (block 58), a check is first performed to determine if there is any downstream device in an off-hook condition (block 60). Assuming that the downstream device remains off-hook (NO branch from decision block 62) and that a predetermined eavesdropping timeout period (typically 60 seconds) has not already expired (NO branch from decision block 64) the eavesdrop process determines if a CNG sequence has been received (block 66) or if a predetermined period of silence has elapsed (block 68), whereupon the previously described call answer process is activated (block 70). Otherwise, the entire process (blocks 68–62) is repeated until either the timeout period has expired (block 64) or the downstream device returns to its on-hook state (block 62).

Alternatively, in the event there is no off-hook downstream device (NO branch from block 60), the eavesdrop process looks for a CNG sequence to be received (block 72) until either the timeout period has expired (block 74) or a downstream device goes offhook (block 60). If the CNG sequence is received before the timeout period has elapsed, then the device enters the previously described call answering mode (block 70). It is believed that silent sequence detection is practical only when monitoring a downstream device connected in series with the monitoring device, since when monitoring another device connected in parallel with the monitoring device, the impedance of the monitoring device must remain sufficiently high that it appears to be on-hook, and the monitoring device thus sees only a small fraction of the available signal, thereby making it exceedingly difficult to distinguish between silence and a low level audio signal having no distinctive waveform.

In summary, the present invention is superior to the known prior art in the following respects:

1. The user need only choose between two receive modes instead of three or more, without sacrificing any features or capabilities.
2. Only a simple on/off Auto Answer switch is required on the front panel.
3. The user need only decide whether the facsimile does not answer facsimile calls or answers facsimile calls automatically within the set number of rings.
4. The receive mode behavior is readily understandable to a person familiar with the operation of a conventional telephone answering machine.
5. The facsimile is automatically enabled to listen for facsimile tones (eavesdrop) whenever such a response would be appropriate.
6. The Auto Receive mode automatically uses silent detection whenever such an option is practical.
7. Other devices can be connected and disconnected in series or in parallel without requiring the user to reconfigure the Auto Answer mode of the facsimile device.

What is claimed is:

1. In a facsimile device for receiving incoming facsimile transmissions over an incoming telephone line to which a downstream telephone answering device may optionally be connected:

mode means responsive to a first manual input, for selecting one of only two possible operational modes: a single automatic receive mode and a manual receive mode;

delay setting means for setting a predetermined number of rings following the beginning of a ring sequence representative of a new incoming call after which the facsimile device automatically goes off-hook when in the automatic receive mode;

start means responsive to a second manual input, for initiating manual reception of an incoming facsimile transmission, a ring detection process responsive to the delay setting mean, for determining whether said predetermined number of rings has elapsed following the reception of said ring sequence representative of an incoming call;

a monitoring process for determining whether an incoming fax tone representative of an incoming facsimile transmission has been received before said predetermined number of rings had been received; and a call answering process responsive to the manually operated start means and to the ring detection process and to the monitoring process, for answering the incoming call by maintaining the facsimile device in an off-hook condition and transmitting an outgoing fax tone representative of readiness to receive an incoming facsimile transmission, wherein the call answering process is enabled if and only if the start means has been manually operated, or the facsimile device is in said single automatic receive mode and the predetermined number of rings have been received, or the facsimile device is in said single automatic receive mode and the incoming fax tone is detected before the predetermined number of rings have been received; and the facsimile device is configured for operating in said single automatic mode independently of whether a second device is connected to the same line and independently of how and where that other device is connected to said line.

2. The facsimile device of claim 1, wherein the monitoring means is responsive both to a CNG sequence comprising a first distinctive pattern of audible signals and to a silence sequence comprising a predetermined period of time devoid of any audible signals.

3. The facsimile device of claim 1, wherein the incoming fax tone may be either a CNG sequence comprising a first distinctive pattern of audible signals or a silence sequence comprising a predetermined period of time devoid of any audible signals, and the outgoing fax tone is a CED sequence comprising a second distinctive pattern of audible signals.

4. The facsimile device of claim 3, wherein the monitoring process is able to detect a CNG sequence received over the communication line when the second device is off-hook and the facsimile device is on-hook.

5. The facsimile device of claim 3, wherein the monitoring process detects whether the other device is on-hook or off-hook, and is able to detect said silence sequence when the second device is off-hook and no CNG sequence has been received.

6. The facsimile device of claim 5, wherein the silence sequence is detected by the monitoring means only if the second device is downstream from the facsimile device.

7. The facsimile device of claim 6, wherein the second device is connected to the communication line in series with the facsimile device.

8. The facsimile device of claim 4, wherein the second device is connected in parallel with the facsimile device.

* * * * *